United States Patent [19]

Cheatum

[11] Patent Number: 4,615,238
[45] Date of Patent: Oct. 7, 1986

[54] PLANETARY GEAR DRIVE FOR BALERS

[75] Inventor: Leo G. Cheatum, Ottumwa, Iowa

[73] Assignee: Deere & Company, Moline, Ill.

[21] Appl. No.: 757,239

[22] Filed: Jul. 22, 1985

[51] Int. Cl.[4] ............................................. F16H 37/06
[52] U.S. Cl. ................... 74/674; 74/665 F; 74/785; 100/179
[58] Field of Search ............... 100/179–186; 74/674, 665 F, 785–788, 665 GA

[56] References Cited

U.S. PATENT DOCUMENTS

| | | | |
|---|---|---|---|
| 1,836,298 | 12/1931 | Winther | 74/788 |
| 2,665,631 | 1/1954 | Paul | 100/179 |
| 2,929,313 | 3/1960 | Lutman et al. | 100/142 |
| 3,100,437 | 8/1963 | Nolt et al. | 100/179 |
| 3,508,448 | 4/1970 | Smith | 74/15.4 |
| 3,906,852 | 9/1975 | Robinson, Jr. et al. | 100/179 |
| 4,241,654 | 12/1980 | van der Lely | 100/189 |

OTHER PUBLICATIONS

Avco New Idea, brochure on Rectangular Balers, Form No. 8230-12, showing Baler Models 555 & 565.

Primary Examiner—Kenneth J. Dorner
Assistant Examiner—Dwight G. Diehl

[57] ABSTRACT

A baler for making rectangular bales includes a main drive transmission section embodying a planetary gear set including a planet carrier which serves as an output member for delivering power to a plunger crank and to a knotter and feeder drive shaft. Power is delivered to the sun gear of the planetary gear set through a path including an input shaft adapted for connection to a towing tractor PTO shaft, a wet slip clutch, a simple input bevel gear set, a flywheel and an intermediate shaft having a plate fixed to one end thereof and secured to the flywheel by a shear bolt and having the sun gear integral with a second end thereof.

8 Claims, 2 Drawing Figures

PLANETARY GEAR DRIVE FOR BALERS

BACKGROUND OF THE INVENTION

The present invention relates to balers for making rectangular bales and more particularly relates to gear transmissions for driving various mechanisms of such balers.

One known baler drive includes a spiral bevel gear set which runs in an oil bath. The gear set driving gear is carried at the rear end of a fore-and-aft extending input shaft carrying a flywheel at its forward end, with power being delivered to the flywheel through means of a slip clutch. The gear set driven gear is mounted on a transverse output shaft having a crank formed therein and coupled for driving the baler plunger. The output shaft delivers power through a bevel gear set to further shaft and gear sets arranged for driving the baler feeder and knotter.

In U.S. Pat. No. 3,508,448 issued to Smith on 28 April 1970 there is disclosed a baler drive including a pair of concentric input shafts which are respectively adapted for receiving power from a tractor PTO driven at either 540 rpm or 1,000 rpm. A flywheel is coupled for being driven at 1,000 rpm regardless of the tractor PTO speed. Therefore, the flywheel can be made smaller than it would otherwise have to be if rotated at 540 rpm by the tractor PTO.

The first prior art baler design discussed above has the disadvantages that (a) the flywheel is relatively heavy because its speed when driven by a tractor having a 540 rpm PTO speed is relatively slow, and (b) the spiral bevel gears are difficult to manufacture in the sizes necessary to carry the torque required for plunger operation. Both of these factors add to the expense of the drive.

The second prior art or patented baler design discussed above has the disadvantage that the concentric shaft and gearing arrangement is a relatively complex way to ensure that the flywheel operates at high speed and can thus be made relatively small.

SUMMARY OF THE INVENTION

According to the present invention there is provided an improved baler drive.

An object of the invention is to provide a baler drive using gearing of a simple construction and arranged in a relatively simple compact manner designed to permit the usage of a relatively small flywheel.

A more specific object is to provide a baler drive including planetary gearing with the sun gear being driven through a shaft connected to the flywheel, and with the planet carrier being connected directly to the plunger crank and carrying a simple bevel gear drivingly engaged with a bevel gear carried by a knotter and feeder drive shaft.

Yet another object is to provide a planetary gear drive, for a baler, including an input sun gear driven by a shaft coupled to a flywheel by a shear bolt, the flywheel in turn being driven through a simple bevel gear set.

Still another object is to provide a baler drive having an input shaft disposed so as to be substantially aligned with the PTO of a towing tractor when the baler draft tongue is swung for disposing the baler in an operating position to one side of the path traveled by the tractor.

These and other objects, features and advantages of the present invention will become apparent to those skilled in the art from the description which follows and from the drawing.

DESCRITPION OF THE PREFERRED EMBODIMENT

Figure 1:
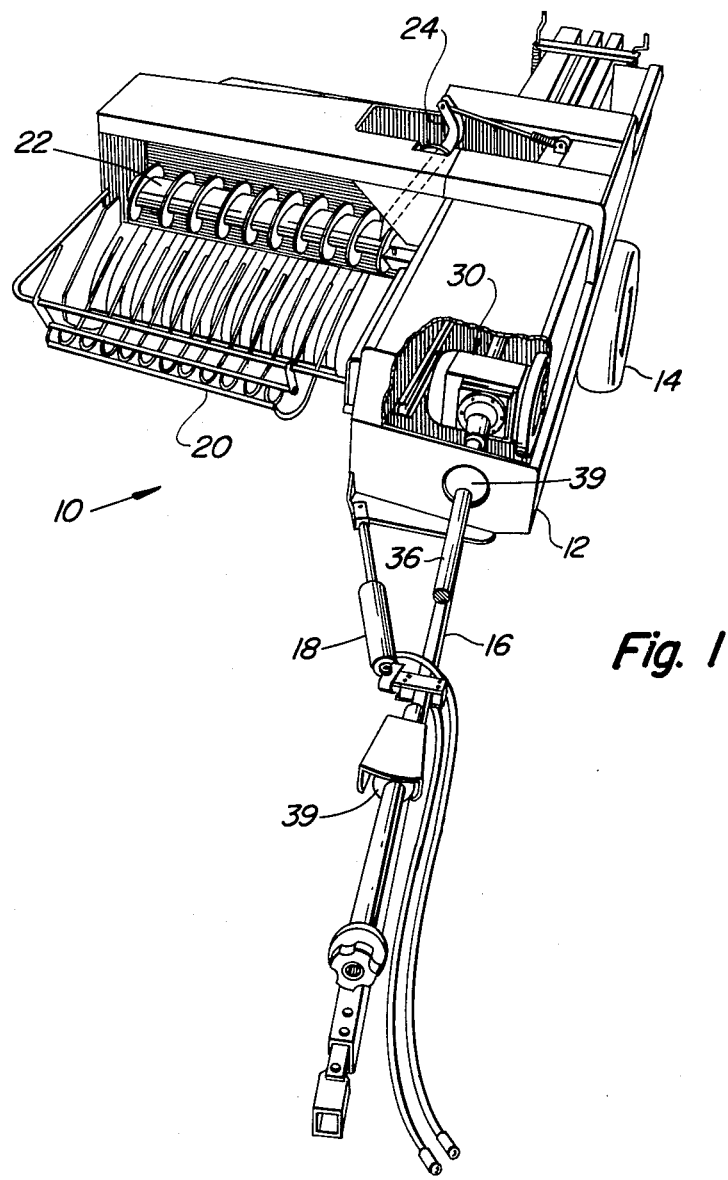
FIG. 1 is a top left perspective view of a baler with sheet metal covering removed exposing the main baler drive transmission section.

Referring now to the drawing, there is shown a baler 10 for making rectangular bales and including a main frame 12 supported on a pair of ground wheels 14 of which only the left wheel is visible. Coupled to the forward end of the frame 12 is a draft tongue 16 having its rear end coupled to the frame by a vertical pin (not visible) permitting the tongue to be swung horizontally to dispose it either in a transport position, wherein it tracks directly behind a towing tractor, or in a working position, as shown in FIG. 1, wherein it follows a path to one side of that traveled by the towing tractor. A hydraulic actuator 18 is mounted between the tongue 16 and frame 12 for selectively shifting the tongue. Suspended from the frame 12 is a crop pickup 20 of a conventional construction including rows of tines mounted to a rotatable shaft and adapted for elevating a windrowed crop to a cross auger 22 which moves the crop toward a baling chamber or case. A fork feeding mechanism 24 is provided adjacent one end of the auger 22 for distributing crop evenly into the chamber.

Figure 2:
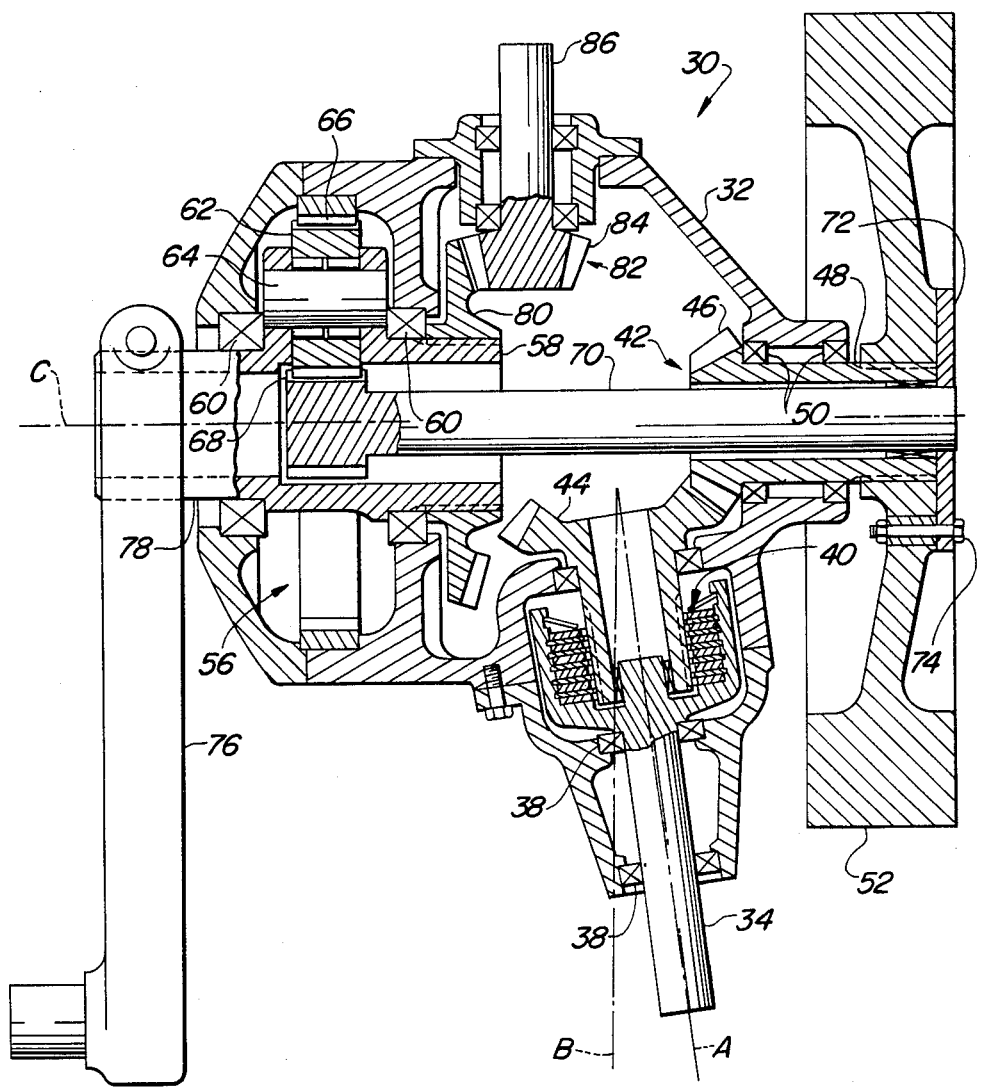
FIG. 2 is a horizontal sectional view taken through the main drive transmission shown in FIG. 1 and exposing the encased planetary gearing of the transmission.

Supported on the frame 12 ahead of the baling chamber is a main drive transmission section 30. Referring now also to FIG. 2, it can be seen that the transmission section 30 includes a gear housing or case 32 having an input shaft 34 projecting through a forward portion thereof and connected to the rear end of a power shaft 36 adapted for having its forward end coupled to a tractor PTO shaft. It is here noted that the input shaft 34 is supported in the housing 32, by a pair of bearings 38, for rotation about an axis A angled leftwardly from a fore-and-aft line B extending parallel to the path of travel of the baler so that the power shaft 36 is aligned with the input shaft resulting in power delivery through universal joints 39, provided in the power shaft 36, being at a substantially constant velocity. The input shaft 34 is coupled, by a wet slip clutch 40, to drive a simple input bevel gear set 42 comprising a drive or input bevel gear 44 and a driven or output bevel gear 46. The driven bevel gear 46 includes an elongate tubular hub 48 rotatably supported in the housing 32, by a pair of bearings 50, for rotation about a transverse axis C extending perpendicular to the line B. A flywheel 52 is splined to an outer end of the gear hub 48 and is thus driven by power flowing through the slip clutch 40. Located in a left end portion of the housing 32 is a planetary gear set 56. The gear set 56 includes a somewhat tubular planet gear carrier 58 which is rotatably supported in the housing 32, by a pair of bearings 60, for rotation about the axis C. Located in a zone between the bearings 60 is a set of three equiangularly arranged planet gears 62 (only one shown) rotatably mounted on pins 64 fixed in the carrier 58. The planet gears 62 are meshed both with a ring gear 66 fixed to the housing 32, so as to form a reactive member of the planetary gear set, and with an input sun gear 68. The sun gear 68 is formed integrally with the left end of an intermediate shaft 70 disposed along the axis C and having a right end portion rotatably supported in the hub portion 48 of the bevel gear 44. An annular plate or disc 72 is fixed on the left end of the shaft 70 and is coupled to the flywheel 52 for rotation therewith by a shear bolt 74. Thus, it will be appreciated that breakage of the bolt 74 disconnects power from the planetary gear set 56. The carrier 58 serves as the output member of the planetary gear set. Specifically, a baler plunger crank 76 is fixed to a left end portion 78 of the carrier 58 which projects leftwardly from the housing 32. Splined onto a left end of the carrier 58 is a drive or input bevel gear 80 of a simple output bevel gear set 82 including a driven or output bevel gear 84 formed integrally with the forward end of a fore-and-aft extending knotter and feeder drive shaft 86. The drive shaft 86 is appropriately coupled with further shaft and gear elements drivingly coupled to the fork feeding mechanism 24 and to a knotter mechanism (not shown) for joining opposite ends of twine or wire for binding the bales, in a manner well-known in the art.

The operation of the main drive transmission section 30 is thought to be clear from the foregoing description and for the sake of brevity is not reiterated here. Suffice it to say that the usage of planetary gearing with its speed reduction capability makes it possible to use a simple bevel gearing input for driving the flywheel at a relatively high speed even if the PTO speed of the towing tractor is only 540 rpm. This, of course, makes it possible to use a flywheel of relatively small size. Further, the planetary gear arrangement makes possible a very compact main drive transmission.

I claim:

1. In a main drive transmission section, for a baler for making rectangular bales, including gearing located within a housing and coupled for being driven by a forwardly extending input shaft and coupled for driving a plunger crank and a feeder and knotter drive shaft, the improvement comprising: said gearing including a planetary gear set having a planet gear carrier, bearings supporting the carrier in the housing for rotation about a horizontal transverse axis; planet gear means mounted to the carrier, a ring gear fixed to the housing and meshed with the planet gear means and a sun gear meshed with said planet gear means; said carrier having an end projecting from one side of the housing; said plunger crank being fixed to said end of the carrier; said gearing located within said housing including an output bevel gear set comprising a drive gear fixed to the carrier for rotation about said transverse axis and a driven bevel gear fixed to said knotter and feeder drive shaft.

2. The main drive transmission defined in claim 1 wherein said gearing located within said housing includes an input bevel gear set including a drive bevel gear coupled to said input shaft; and a driven bevel gear coupled to said sun gear.

3. The main drive transmission defined in claim 1 wherein said gearing located within said housing includes an input bevel gear set including a drive bevel gear and a driven bevel gear; a wet slip clutch coupling said input shaft to the drive bevel gear of the input bevel gear set; and the driven bevel gear of the input bevel gear set being coupled to said sun gear.

4. The main drive transmission defined in claim 1 wherein an intermediate shaft is disposed in said housing along said transverse axis and has an end portion projecting through a side of said housing which is opposite from said first mentioned side; and a flywheel located exteriorly of said housing; means including a shear bolt fixing the flywheel to said shaft for rotation therewith; said sun gear being fixed to said shaft and a coupling means including a simple input bevel gear means drivingly coupling the input shaft to the flywheel.

5. The main drive transmission defined in claim 1 wherein said carrier is tubular; said bearings including a pair of bearings located at opposite sides of said ring gear; said plunger crank and drive bevel gear of the output bevel gear set being located at opposite sides of said pair of bearings; and said sun gear being located within said carrier.

6. The main drive transmission defined in claim 1 wherein said input shaft is angled relative to a fore-and-aft line extending perpendicular to said transverse axis whereby the input shaft is adapted for being driven by a power shaft aligned therewith so that power delivery may be at a substantially constant velocity despite the presence of universal joints in the power shaft.

7. The main drive transmission defined in claim 1 wherein said gearing located within the housing includes a simple input bevel gearing set comprising a drive bevel gear and a driven bevel gear; said drive bevel gear of the input bevel gear set being coupled to said input shaft; said driven bevel gear of the input bevel gear set including a tubular hub located on said transverse axis and being rotatably supported in and projecting through a side of the housing which is opposite from the first mentioned side; a flywheel fixed on said tubular hub exteriorly of said housing; an intermediate shaft located in said housing along said transverse axis and projecting through and being rotatably supported in said tubular hub; a plate fixed to said shaft exteriorly of the housing; a shear bolt coupling the plate to the flywheel; and said sun gear being fixed to said intermediate shaft.

8. The main transmission defined in claim 7 wherein a wet slip clutch couples the input shaft to the drive bevel gear of the input bevel gear set.

* * * * *